(12) United States Patent
Kimmerle et al.

(10) Patent No.: US 10,473,448 B2
(45) Date of Patent: Nov. 12, 2019

(54) DEVICE AND METHOD FOR DETERMINING A RELATIVE DEFLECTION

(71) Applicant: Robert Bosch GmbH, Stuttgart (DE)

(72) Inventors: Mathias Kimmerle, Steinheim (DE); Michael Kleinknecht, Lehrensteinsfeld (DE); Remigius Has, Grafenau-Daetzingen (DE); Wolfgang Welsch, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/373,044

(22) Filed: Dec. 8, 2016

(65) Prior Publication Data

US 2017/0176166 A1    Jun. 22, 2017

(30) Foreign Application Priority Data

Dec. 17, 2015   (DE) .................. 10 2015 225 695

(51) Int. Cl.
*G01B 7/14*  (2006.01)
*G01B 7/00*  (2006.01)
*G01D 5/20*  (2006.01)
*G01D 5/243*  (2006.01)

(52) U.S. Cl.
CPC .............. *G01B 7/14* (2013.01); *G01B 7/003* (2013.01); *G01D 5/2006* (2013.01); *G01D 5/243* (2013.01)

(58) Field of Classification Search
CPC .... G01D 5/202; G01D 5/2073; G01D 5/2086; G01D 5/2093; G01D 5/2046; G01D 5/2006; G01D 5/2013; G01D 5/2053; G01D 5/2216; G01D 5/2258; G01D 5/2455; G01B 7/14; G01B 7/003; G01B 7/30; G01R 27/26; G01R 27/2611
See application file for complete search history.

(56) References Cited

U.S. PATENT DOCUMENTS

| | | | | |
|---|---|---|---|---|
| 4,737,698 A | * | 4/1988 | McMullin | G01P 3/42 318/653 |
| 5,025,213 A | * | 6/1991 | Dobler | G01D 5/202 324/207.12 |
| 6,011,389 A | * | 1/2000 | Masreliez | G01D 5/2046 324/207.17 |
| 6,259,249 B1 | * | 7/2001 | Miyata | G01B 7/003 324/207.12 |
| 6,384,598 B1 | * | 5/2002 | Hobein | G01D 5/2046 318/654 |
| 9,322,636 B2 | * | 4/2016 | Fontanet | G01B 7/30 |
| 9,638,763 B2 | * | 5/2017 | Reitsma | G01R 33/0023 |
| 2006/0076949 A1 | * | 4/2006 | Kawatoko | G01D 5/2053 324/207.17 |

(Continued)

FOREIGN PATENT DOCUMENTS

DE   10 2011 085 740 A1   5/2013

*Primary Examiner* — Lee E Rodak
(74) *Attorney, Agent, or Firm* — Maginot, Moore & Beck LLP

(57) ABSTRACT

A device is configured to determine a relative deflection of two transmitter elements by a sensor element. The transmitter elements are arranged at the sensor element. The deflection of the transmitter elements with respect to one another at the sensor element can be determined based on a degree of overlap of conductive regions of the transmitter elements by the sensor element.

20 Claims, 3 Drawing Sheets

(56) References Cited

U.S. PATENT DOCUMENTS

| | | | |
|---|---|---|---|
| 2008/0197836 A1* | 8/2008 | Lee | G01D 4/008 324/207.16 |
| 2010/0188104 A1* | 7/2010 | Speckmann | G01D 5/202 324/656 |
| 2010/0308803 A1* | 12/2010 | Schaeuble | G01D 5/2455 324/207.15 |
| 2013/0314077 A1* | 11/2013 | Okada | G01B 7/14 324/207.12 |
| 2015/0211895 A1* | 7/2015 | Reitsma | G01D 5/202 324/207.16 |
| 2016/0069662 A1* | 3/2016 | Mullenix | G01D 5/22 324/207.15 |

* cited by examiner

DEVICE AND METHOD FOR DETERMINING A RELATIVE DEFLECTION

This application claims priority under 35 U.S.C. § 119 to patent application number DE 10 2015 225 695.2, filed on Dec. 17, 2015 in Germany, the disclosure of which is incorporated herein by reference in its entirety.

BACKGROUND

The published patent application DE 10 2011 085 740 A1 discloses an inductive distance sensor comprising a coil and a target movable in a direction of movement relative to the coil, wherein an inductance of the coil is dependent on a relative position of the target with respect to the coil. The coil and the target at least partly overlap in the direction of movement.

SUMMARY

The device according to the disclosure for determining a relative deflection of two transmitter elements comprises at least two transmitters and at least one sensor element. According to the disclosure, the transmitter elements are arranged at the sensor element in such a way that the deflection of the transmitter elements with respect to one another are determinable depending on a degree of overlap of conductive regions of the transmitter elements by means of the sensor element. For this purpose, the transmitter elements comprise at least one region of a conductive component and at least one region of a nonconductive component. On account of the fact that the relative deflection of the transmitter elements can be determined by means of the sensor element on the basis of the degree of overlap, a simple and non-contact detection of a relative deflection of the two transmitter elements is possible. The transmitter elements can be mounted on movable components or be integrated into the latter. By means of the sensor element, the relative deflection of the movable components can then be determined by way of the degree of overlap of the conductive regions of the transmitter elements. Such components may be, for example, a booster body and an input element of a braking force booster, wherein the relative deflection of booster body and input element is required for controlling the braking force boosting.

A region of a conductive component can be understood to mean regions of the transmitter element which consist of metal, for example, and nonconductive regions of the transmitter element can be understood to mean for example regions which consist of plastic.

In an advantageous configuration of the device for determining a relative deflection, the transmitter elements are arranged in such a way that they are movable both in the same direction with one another and in opposite directions with respect to one another. In this way a relative deflection of the elements is possible, which is intended to be determined. Furthermore, a synchronous movement, in the case of which the relative deflection does not change, can likewise be differentiated. In the case of the components to be measured there may be operating situations in which components also run jointly, that is to say do not move away from one another.

In a further configuration, the transmitter elements are movable horizontally in relation to the sensor element. In this way the sensor element can remain stationary, whereas in contrast the transmitter elements move horizontally movably in relation to the fixed sensor element. This enables a simple arrangement of the elements with respect to one another, which is furthermore also space-saving.

In an advantageous configuration, the transmitter elements are vertically offset with respect to one another and either arranged above the sensor element or arranged above and below the sensor element. In this way, depending on the structural space present that is available for installing the device, an appropriate arrangement of the transmitter elements and of the sensor element can be chosen.

In a further configuration, the sensor element comprises at least one coil. The coil enables the non-contact detection of the relative deflection of the transmitter elements by means of an inductive measurement principle.

In a further configuration, the conductive regions of the transmitter elements have surfaces which face the sensor element. The conductive regions of the first and second transmitter elements can have substantially identical dimensions.

It is advantageous that the surfaces of the conductive regions have dimensions substantially identical to those of the surfaces of the at least one coil. In this way it is possible to generate a signal in a simple manner if conductive regions overlap the coil, the signals of which are dependent on the degree of overlap with a conductive region and, if appropriate, with a further conductive region.

In one configuration, the at least one coil is part of a resonant circuit. The resonant circuit has a resonant frequency. By analyzing the resonant frequency of the resonant circuit it is possible to determine the inductance of the coil. Since the inductance of the coil is a measure of the overlapping or overlap by at least one conductive region of a transmitter element, in this way a relative deflection can be electronically detected and determined by means of an evaluation of the resonant circuit. In this case, the degree of overlap of the sensor element of the transmitter elements is determinable on the basis of the resonant frequency of the resonant circuit, said resonant frequency being dependent on the inductance of the coil.

In a configuration of the disclosure, the conductive regions of the transmitter elements are metallic, in particular composed of aluminum or copper, and the nonconductive regions are composed of plastic. The nonconductive regions can also be provided in the form of cutouts in a carrier, for example a printed circuit board, for the conductive regions, for example in the form of holes. Likewise, the nonconductive regions can be formed by the carrier itself, wherein the conductive regions are carried or held by the carrier or are integrated into the latter.

The method according to the disclosure for determining a relative deflection of two transmitter elements by means of a device according to the disclosure and by means of a control unit comprises the following steps:

determining a resonant frequency of the resonant circuit assigning a relative deflection corresponding to the resonant frequency outputting and/or storing the corresponding relative deflection.

DETAILED DESCRIPTION

Figure 1:
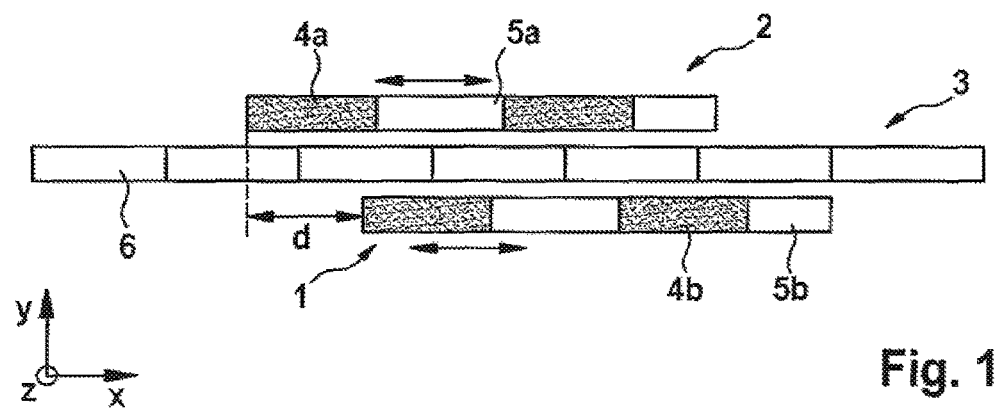
FIG. 1 shows a device for determining a relative deflection comprising two transmitter elements and a sensor element.
Figure 1A:
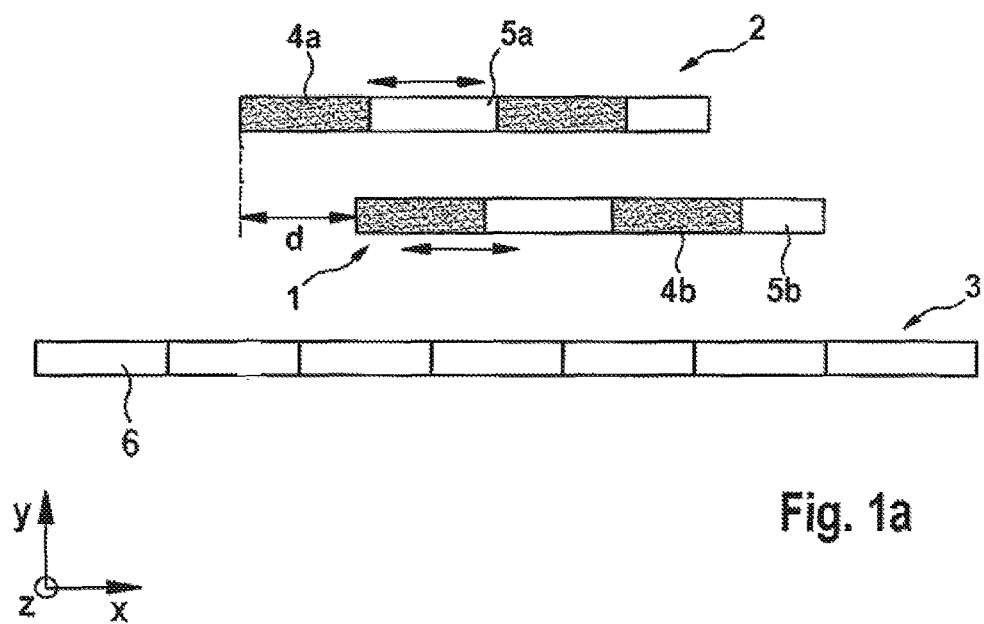
FIG. 1a shows transmitter elements arranged on one side of the sensor element.

FIG. 1 shows a sensor arrangement, comprising two transmitter elements 1, 2. A relative deflection of the transmitter elements 1, 2 can be detected by means of a sensor 3. In FIG. 1, a relative deflection is designated by the variable d. The transmitter elements 1, 2 are arranged movably with respect to one another. The transmitter elements 1 and 2 can be arranged in such a way that they are arranged above and below the sensor element 3. Alternatively, both transmitter elements 1 and 2 can also be arranged on one side of the sensor element 3 as depicted in FIG. 1a. Alternative arrangements with a different coil geometry are likewise conceivable. By way of example, an arrangement of one transmitter element above and a further transmitter element laterally would be possible.

The sensor element 3 and the transmitter elements 1 and 2 are arranged parallel to one another. In one configuration of the disclosure, the sensor element 3 is fixed in a stationary manner and the sensor elements 1, 2 are movable with respect to one another. In the coordinate system shown in FIG. 1, the transmitter elements 1, 2 are arranged movably with respect to one another along the x-direction.

Each of the transmitter elements 1, 2 has a subdivision. The subdivision is fashioned such that the transmitter elements 1, 2 comprise regions of a conductive component 4a, 4b and regions of a nonconductive component 5a, 5b. Regions of a conductive component should be understood to mean that these regions consist of a conductive material. Regions of a nonconductive component 5a, 5b are provided from no material, or a material which is not electrically conductive. A nonconductive component composed of no material can be understood to mean that gaps are left in a carrier. The carrier can carry the components composed of conductive material, wherein nonconductive components— in this case in the form of gaps—are respectively arranged between the conductive components. Conductive regions 4a, 4b can consist for example of aluminum or of copper, and nonconductive regions 5a, 5b of plastic.

It is not necessary for the conductive regions 4a, 4b of the transmitter elements 1, 2 to consist of the same material. It is likewise conceivable for the conductive region 4a of the second transmitter element 2 to comprise a different material than the conductive region 4b of the transmitter element 1. All that matters is that both regions are electrically conductive.

Provision is made for at least one region of a conductive component 4a, 4b and at least one region of a nonconductive component 5a, 5b to be present in the transmitter elements 1, 2. It is likewise possible for a plurality of regions of conductive components 4a, 4b and a plurality of regions of nonconductive components 5a, 5b to be present. The regions of the conductive component 4a, 4b and the regions of the nonconductive components 5a and 5b are arranged alternately alongside one another. The alternate arrangement can be provided in a linear fashion.

The sensor element 3 consists of one or more sensor coils 6. The sensor coils 6 are arranged alongside one another. The sensor coils 6 can be arranged linearly alongside one another.

A relative deflection d of the transmitter elements 1, 2 with respect to one another can be determined by means of the present sensor arrangement. The underlying measurement principle is based on the fact that an overlapping of the conductive regions 4a, 4b of the transmitter elements 1, 2 can bring about, in a coil 6 of the sensor element 3, a different signal than an overlapping of the sensor element 6 with a conductive region 4a, 4b and a corresponding nonconductive region 5a, 5b of the sensor elements 1, 2. An overlapping with only nonconductive regions 5a, 5b of the transmitter elements 1, 2 also brings about a different signal in the coil 6 of the sensor element.

In order to be able to measure—wholly or partly—an overlapping of the conductive regions 4a, 4b with corresponding nonconductive regions 5a, 5b, the coils 6 of the sensor element 3 have to be dimensioned accordingly. Since the signal to be measured is dependent on an overlap of the regions of the first and second sensor elements, the area of the coils 6 of the sensor element 3 must have at least one sensitive area which corresponds to the size of the regions 4a,b and 5a,b of the transmitter elements 1 and 2. In particular, projection areas of the regions 4a, 4b, 5a, 5b on the sensor element 3 must be able to be detected by means of a coil 6 of the sensor element 3. For this purpose, the sensitive area of the coils 6 of the sensor element 3 may be smaller than, identical to, or larger than the projection area of the regions 4a, 5a, 4b, 5b. In one concrete embodiment, the coil(s) 6 and the areas of the regions 4a, 4b, 5a, 5b of the transmitter elements may be substantially identical.

Figure 4:
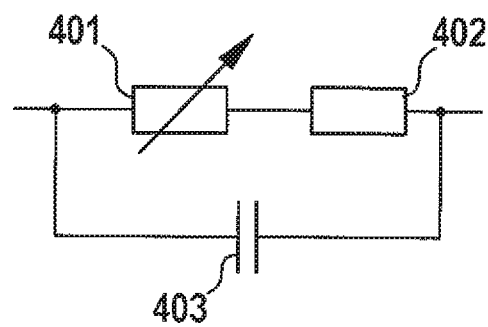
FIG. 4 shows a circuit for signal evaluation.

The underlying measuring circuit is described with reference to FIG. 4. FIG. 4 shows a series connection of a coil 401 with a resistor 402. A capacitor 403 is connected in parallel with the resistor 402 and the coil 401. This substantially corresponds to a resonant circuit. The resonant circuit has a resonant frequency f dependent on the components used, that is to say the inductance L of the coil 401 and the capacitance C of the capacitor 403.

The resonant frequency f essentially results from the following formula.

$$f = \frac{1}{2 \cdot \pi \cdot \sqrt{L \cdot C}}$$

The resonant frequency f is thus dependent on the inductance of the coil L. The inductance of the coil 401 is influenced in the case of the present measurement principle. For this purpose, the coil is excited with an AC voltage. The coil 401 is to be compared with a coil 6 of the sensor element 3. If a conductive element, such as e.g. one of the conductive elements 4a and 4b, moves in the magnetic field of the coil, then the inductance of the coil 401, 6 is altered by this conductive material. This alteration of the inductance can be examined by observing the resulting resonant frequency f of the resonant circuit. This observation can be carried out by means of corresponding constituents of a controller of the sensor arrangement.

The inductance of the coil depends on how much conductive material is situated in its magnetic field. If just an individual transmitter element 1 is then considered, it becomes clear that, depending on the positioning of the transmitter element 1, above the sensor element 3, a conductive region 4a, 4b can be situated wholly or else only proportionally in the detection region of the coil 6. If an entire conductive region 4a, 4b lies in the detection region of the coil 6, then the resulting signal is different than if a complete nonconductive region 5a is situated in the detection region of the coil 6.

The same also applies to the further transmitter element 2, which likewise generates different signals, depending on the overlap of the conductive and nonconductive regions 4b, 5b in the sensitive region of the coil 6.

The changing overlap of the coil 6 by the conductive regions 4a,b represents a relative deflection d of the transmitter elements 1, 2. In this way it is possible to determine a relative deflection d on the basis of the resonant frequency f of the resonant circuit.

Figure 2:
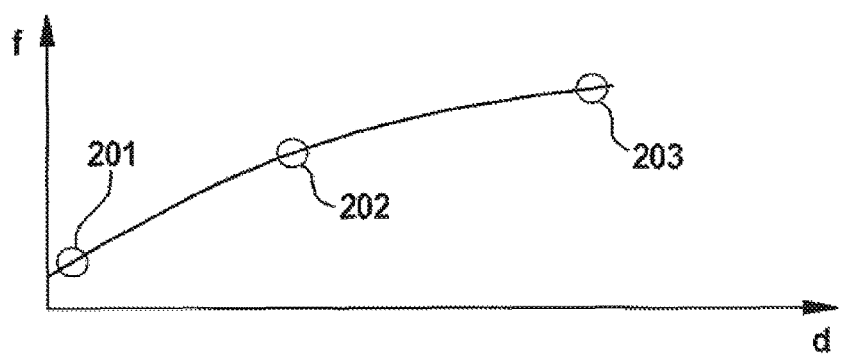
FIG. 2 shows a signal profile for different relative deflections of the transmitter elements.

Examples representing a signal profile depending on the relative position d of the transmitter elements 1, 2 will then be shown with reference to FIG. 2.

In FIG. 2 the resonant frequency f of the resonant circuit is plotted against the relative deflection d of the transmitter elements 1, 2. The resonant frequency may be present for example in units of MHz and the relative deflection in units of mm.

Figure 3A:
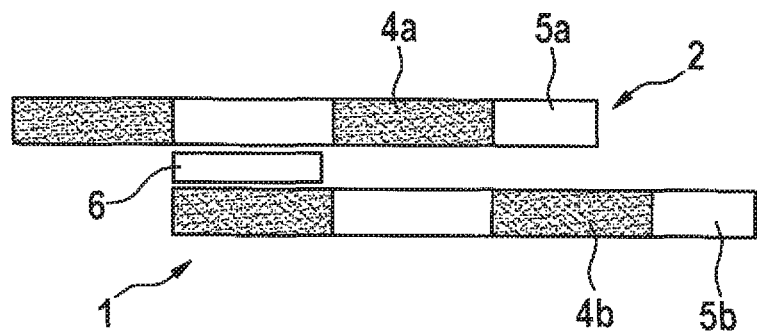
FIGS. 3a-3c show corresponding relative deflections of the transmitter elements.
Figure 3B:
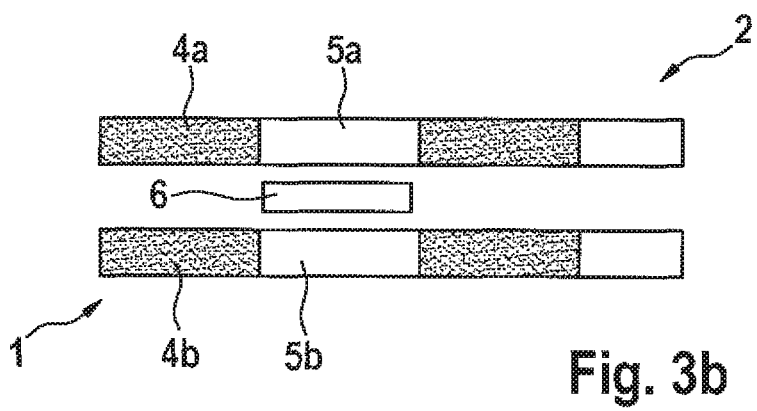

The marking in circular form 201 in FIG. 2 represents by way of example a value which corresponds to a positioning of the transmitter elements 1, 2 with respect to one another such as is illustrated in FIG. 3b. In this case, the coil 6 shown individually here is overlapped only by nonconductive regions 5a and 5b. The signal corresponding to the frequency is low.

In FIG. 3a, by contrast, a situation is present in which a conductive region 4a of the transmitter element 1 respectively overlaps a nonconductive region 5b of the transmitter element 2. Likewise, each conductive region of the transmitter element 2 overlaps a corresponding nonconductive region 5b of the transmitter element 1. This configuration leads to a signal corresponding to the marking 202.

Figure 3C:
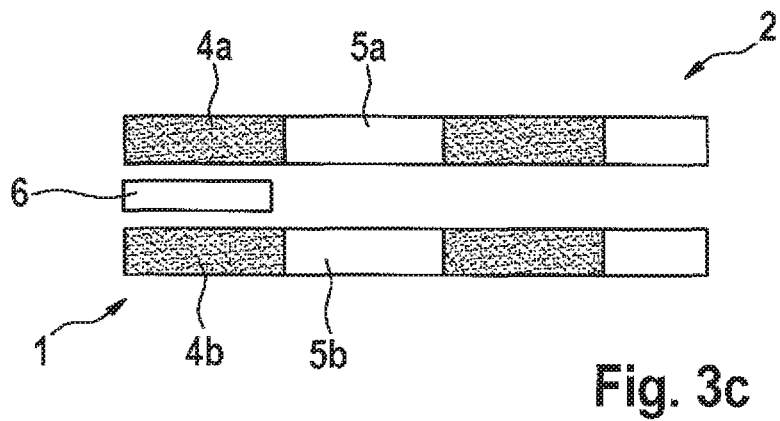

The marking 203 shows a value which is assigned to a relative positioning of the transmitter elements 1, 2 in which conductive regions 4a, 4b respectively overlap and nonconductive regions 5a and 5b respectively overlap. This corresponds to the configuration in FIG. 3c.

The coil 6 is overlapped here by only conductive regions 4a and 4b.

The final signal which corresponds to the relative deflection of the transmitter elements 1, 2 can be determined from the signal of an individual coil 6. Likewise, the signals of coupled coils 6 can be averaged. In this case, consideration should be given to ensuring that appropriate coils 6 are evaluated, taking into consideration the coil geometry and the arrangement and extent of the conductive and nonconductive regions of the transmitter elements involved. In the concrete example from FIG. 1, for example, every second coil would have to be evaluated in a coupled manner. A further conversion of individual signals is likewise possible. Edge effects and uncovered regions of the sensor element 3 should likewise be taken into consideration.

Figure 5:
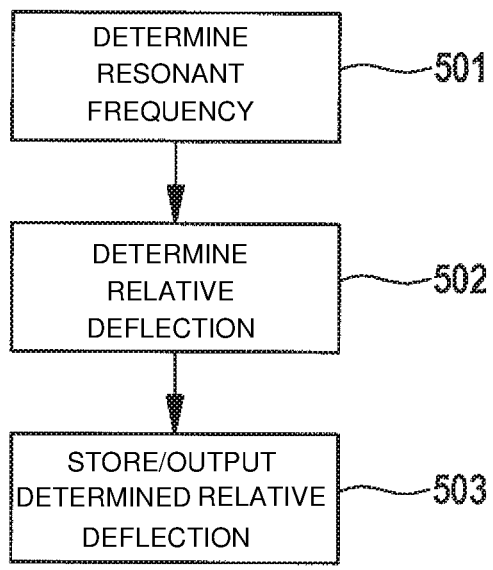
FIG. 5 schematically shows the sequence of the method.

A method for determining a relative deflection is described below with reference to FIG. 5. In order to carry out the method, the sensor arrangement has an assigned control unit, which is not depicted in the figures.

A first step 501 of the method involves determining a resonant frequency f of the resonant circuit. A subsequent step 502 involves determining a relative deflection d of the first and second transmitter elements 1, 2 from the resonant frequency f determined. This determination can be carried out on the basis of a stored characteristic curve having a unique assignment of the resonant frequencies f to relative deflections d. Extraction from a family of characteristic curves is also conceivable.

A further step 503 involves storing and/or outputting the determined relative deflection d by means of the control unit. Outputting can be carried out for example via communication systems in a vehicle. The outputting can be carried out to further controllers of a vehicle which require the magnitude of the relative deflection of two components which are movable with respect to one another.

An electrical braking force booster can be controlled by closed-loop and/or open-loop control on the basis of a relative deflection of its booster body with respect to an input element coupled to the actuation element, in particular to the brake pedal. For this purpose, the booster body of a braking force booster can be connected to a first transmitter element 1, and the input element of the braking force booster to a second transmitter element 2. The transmitter elements 1, 2 move with booster body and input element. The relative deflection of booster body and input element can be deduced by determining the relative deflection of the transmitter elements 1, 2 by means of an appropriately arranged sensor element 3.

A relative deflection determinable with the aid of the sensor arrangement can be for example in the range of a plurality of millimeters, in particular in the range of +/−5 mm.

What is claimed is:

1. A device for determining a relative deflection of two transmitter elements, the device comprising:
   a first transmitter element and a second transmitter element; and
   a sensor element,
   wherein the first and the second transmitter elements are arranged at the sensor element,
   wherein each of the first and the second transmitter elements comprises a plurality of conductive component regions and a plurality of nonconductive component regions,
   wherein deflection of the first transmitter element with respect to the second transmitter element is determinable by a degree of overlap of the plurality of the conductive component regions of the first and the second transmitter elements by the sensor element, and wherein:
   the sensor element comprises at least one coil,
   the plurality of conductive component regions of the first and the second transmitter elements have surfaces facing the sensor element, and
   the surfaces of the plurality of conductive component regions of first and the second transmitter elements have shapes and sizes substantially identical to a shape and a size of a sensing area of the at least one coil.

2. The device according to claim 1, wherein the first and the second transmitter elements are arranged movably in a same direction with respect to one another and in opposite directions with respect to one another.

3. The device according to claim 1, wherein the first and the second transmitter elements are movable horizontally in relation to the sensor element.

4. The device according to claim 1, wherein both of the first and the second transmitter elements, in a manner offset vertically with respect to one another, are arranged above the sensor element.

5. The device according to claim 1, wherein the at least one coil is part of a resonant circuit having a resonant frequency.

6. The device according to claim 5, wherein:
   the degree of overlap of the first and the second transmitter elements is determinable based on the resonant frequency of the resonant circuit, and
   the resonant frequency is dependent on an inductance of the at least one coil.

7. The device according to claim 1, wherein:
the plurality of conductive component regions of the first and the second transmitter elements are metallic, and
the plurality of nonconductive component regions of the first and the second transmitter elements are composed of plastic.

8. The device according to claim 7, wherein the plurality of conductive component regions of the first and the second transmitter elements are composed of aluminum or copper.

9. The device according to claim 1, wherein:
the first and the second transmitter elements are offset vertically with respect to one another,
the first transmitter element is arranged above the sensor element, and
the second transmitter element is arranged below the sensor element.

10. The device according to claim 1, wherein the first and the second transmitter elements are linearly movable transmitter elements.

11. A method for determining a relative deflection of two transmitter elements with a device comprising the two transmitter elements arranged at a sensor element and at least one assigned control unit, the method comprising:
establishing a magnetic field with the sensor element, the sensor element including at least one coil;
positioning the two transmitter elements at least partially within the magnetic field, wherein both of the transmitter elements comprise a plurality of conductive component regions and a plurality of nonconductive component regions, wherein the plurality of conductive component regions of the two transmitter elements have surfaces facing the sensor element, and wherein the surfaces of the plurality of conductive component regions have shapes and sizes substantially identical to a shape and a size of a sensing area of the at least one coil;
determining a relationship between a range of resonant frequencies of a resonant circuit including the sensor element and a relative deflection between the two transmitter elements;
determining a resonant frequency of the resonant circuit including the sensor element within the range of resonant frequencies;
assigning a relative deflection of the first transmitter element with respect to the second transmitter element corresponding to the resonant frequency based upon the determined relationship; and
outputting and/or storing the relative deflection of the first transmitter element with respect to the second transmitter element.

12. The method of claim 11, wherein the two transmitter elements are linearly movable transmitter elements.

13. A device for determining a relative deflection of two transmitter elements, the device comprising:
two linearly movable transmitter elements; and
a sensor element, wherein
the transmitter elements are arranged at the sensor element,
each of the transmitter elements comprises a plurality of conductive component regions and a plurality of nonconductive component regions,
deflection of the transmitter elements with respect to one another is determinable by the device based upon a defined relationship between a range of resonant frequencies of a resonant circuit including the sensor element and a relative deflection between the two transmitter elements, and
both of the transmitter elements, in a manner offset vertically with respect to one another, are arranged above the sensor element.

14. A device for determining a relative deflection of two transmitter elements, the device comprising:
two linearly movable transmitter elements; and
a sensor element with at least one coil, wherein
the transmitter elements are arranged at the sensor element,
each of the transmitter elements comprises a plurality of conductive component regions and a plurality of nonconductive component regions,
deflection of the transmitter elements with respect to one another is determinable by a degree of overlap of the plurality of conductive component regions of the transmitter elements by the sensor element,
the plurality of conductive regions of the transmitter elements have surfaces facing the sensor element,
the surfaces of the conductive regions of the transmitter elements have substantially identical dimensions, and
the surfaces of the transmitter elements have substantially identical shapes and sizes to a shape and a size of a sensing area of the at least one coil.

15. The device of claim 14, wherein both of the transmitter elements, in a manner offset vertically with respect to one another, are arranged above the sensor element.

16. The device of claim 15, wherein:
the at least one coil-comprises a plurality of coils.

17. The device according to claim 16, wherein the at least one coil is part of a resonant circuit having a resonant frequency.

18. The device according to claim 17, wherein:
a degree of overlap of the sensor element by the transmitter elements is determinable based on the resonant frequency of the resonant circuit, and
the resonant frequency is dependent on an inductance of the at least one coil.

19. The device according to claim 14, wherein the transmitter elements are arranged movably in a same direction with respect to one another and in opposite directions with respect to one another.

20. The device according to claim 19, wherein the transmitter elements are movable horizontally in relation to the sensor element.

* * * * *

UNITED STATES PATENT AND TRADEMARK OFFICE
CERTIFICATE OF CORRECTION

PATENT NO. : 10,473,448 B2
APPLICATION NO. : 15/373044
DATED : November 12, 2019
INVENTOR(S) : Mathias Kimmerle et al.

It is certified that error appears in the above-identified patent and that said Letters Patent is hereby corrected as shown below:

In the Claims

In Claim 16, at Column 8, Line 39, delete the "-" between the words "coil" and "comprises".

Signed and Sealed this
Eighteenth Day of February, 2020

Andrei Iancu
*Director of the United States Patent and Trademark Office*